United States Patent [19]

Olasz

[11] 4,170,831
[45] Oct. 16, 1979

[54] BORE GAGE

[75] Inventor: Joseph S. Olasz, North Kingstown, R.I.

[73] Assignee: Federal Products Corporation, Providence, R.I.

[21] Appl. No.: 917,640

[22] Filed: Jun. 21, 1978

[51] Int. Cl.² .............................................. G01B 5/12
[52] U.S. Cl. ................................ 33/178 R; 33/147 K
[58] Field of Search .............. 33/147 K, 178 R, 178 E

[56] References Cited

U.S. PATENT DOCUMENTS

| 1,451,736 | 4/1923 | Lauer | 33/178 R |
|---|---|---|---|
| 2,495,406 | 1/1950 | Buscher et al. | 33/178 R |
| 2,591,452 | 4/1952 | Maag | 33/178 R |
| 2,642,672 | 6/1953 | Lewis et al. | 33/178 R |
| 2,799,092 | 7/1957 | Abramson | 33/178 R |
| 2,842,858 | 7/1958 | Mennesson | 33/178 R |
| 2,881,529 | 4/1959 | Roch | 33/147 K |

FOREIGN PATENT DOCUMENTS 376052  5/1923  Fed. Rep. of Germany ........ 33/178 R

Primary Examiner—Richard R. Stearns
Attorney, Agent, or Firm—Barlow & Barlow

[57] ABSTRACT

A measurement instrument in the form of a bore gage comprises a tubular casing within which there is centered a longitudinal member, one end of which transmits its movements to a gaging device, and the other end of which is coupled to contact elements that move transverse to the casing. The contact elements are characterized as having at least a hemispherical end which engages a pair of cylindrical segments that are cut into opposed V grooves on the other end of the longitudinal member.

5 Claims, 9 Drawing Figures

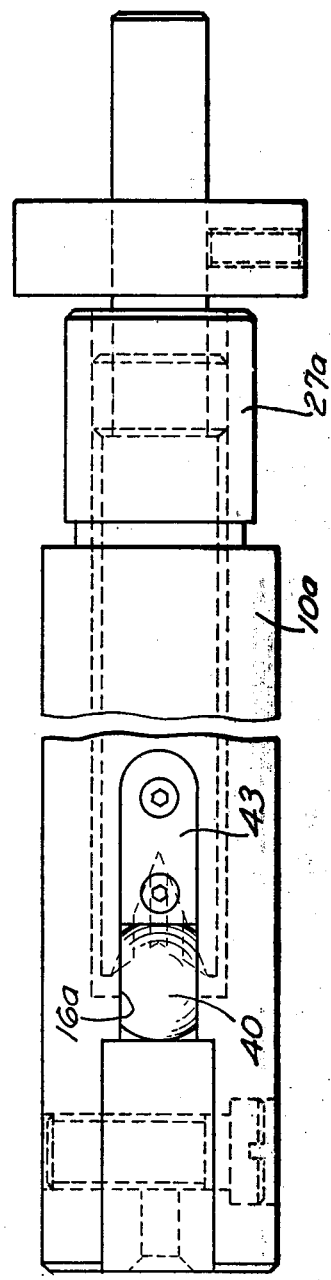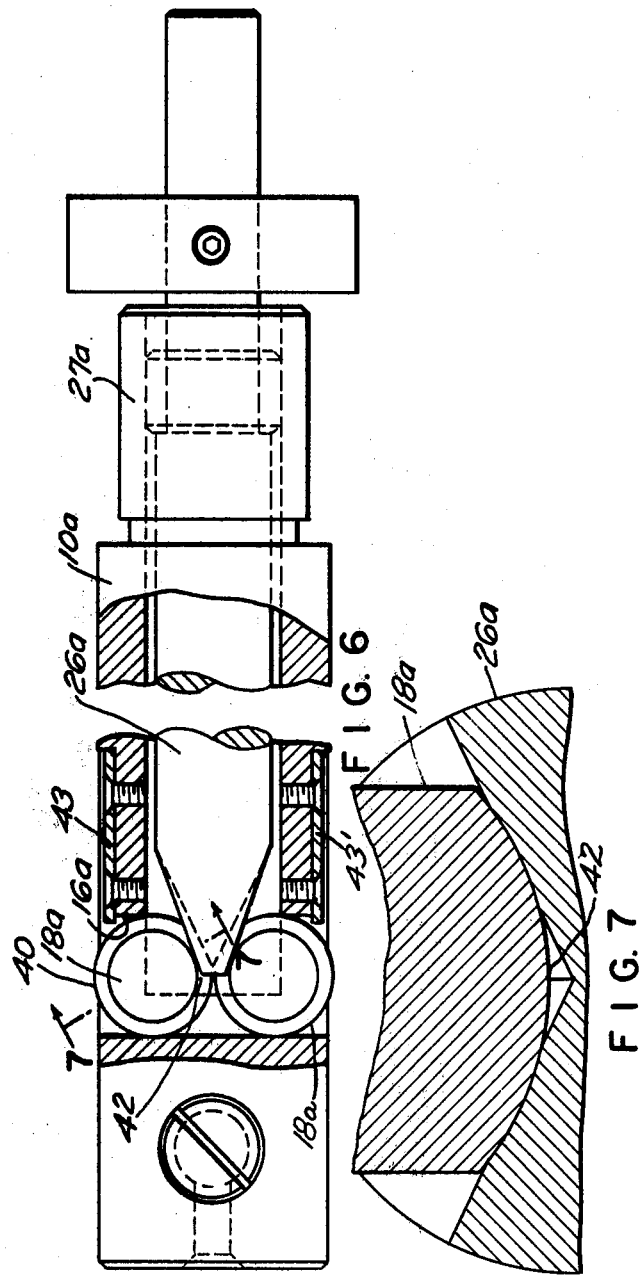

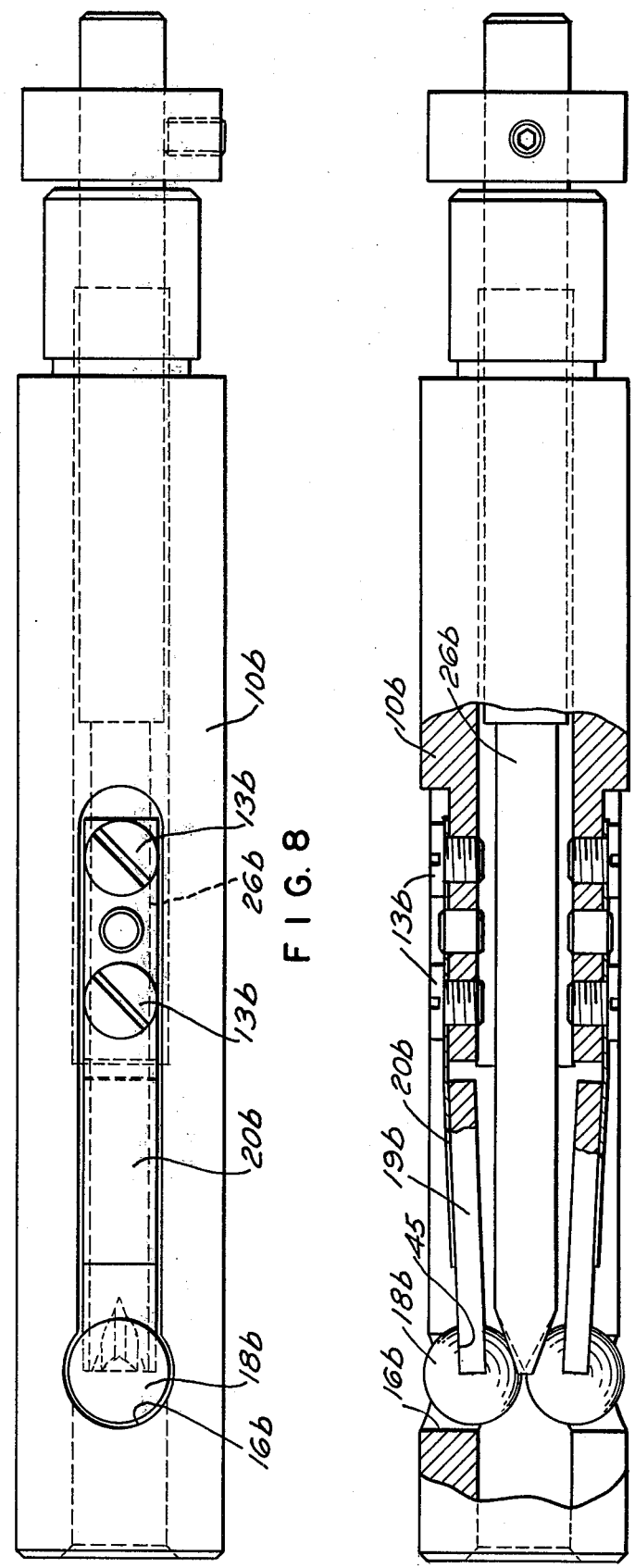

BORE GAGE

BACKGROUND OF THE INVENTION

In the past there has been utilized plug gages which, for example, have three point measurement contacts to centralize the bore gage within the hole and transmit the motion of the movable members back to an indicator such as a dial gage. It has also been suggested as, for example, in the Abramson U.S. Pat. No. 2,799,092 to provide opposed measuring contacts in the form of balls which engage grooves at the end of the measuring plunger or rod. Other types of balls that may be used with bore gages are disclosed, for example, in Lendi et al U.S. Pat. No. 4,058,901.

Instruments of this type have been found to have a small drawback in that the balls bear against the surface of the member that transmits the motion in a point contact form. This means that considerable wear can occur between the balls and the measuring rod which gives a high loading factor. For example, in torture tests the ball contact actually becomes distorted due to a peening action and considerable wear can be detected.

SUMMARY OF THE INVENTION

In order to overcome the difficulty noted above, the present invention provides a bore gage which has a tubular body and an axially movable longitudinal measuring member which transmits axial movements to a measuring system, such as a dial gage or the like, while the other end is provided with a pair of V shaped grooves that have faces provided with cylindrical segments. The cylindrical segments bear against at least hemispherical surfaces on contact elements which move transverse to the tubular casing or body of the instrument and in which the hemispherical ends of the contact elements hava a radius that is equal to the radius of the cylindrical segments so that, in effect, there is a spherical line contact between the hemispherical section and the cylindrical segment sections that distributes the pressure and wear and further prevents any sideplay of the contact elements.

BRIEF DESCRIPTION OF THE DRAWINGS

FIG. 5 is a side elevational view partly in section and showing an alternate form of the device;

FIG. 6 is a top view of FIG. 5;

FIG. 7 is an enlarged sectional view taken on lines 7—7 of FIG. 6;

FIG. 8 is a top view showing a still further embodiment of the invention;

FIG. 9 is a side elevational view partly in section of FIG. 8.

DESCRIPTION OF THE PREFERRED EMBODIMENTS

Figure 1:
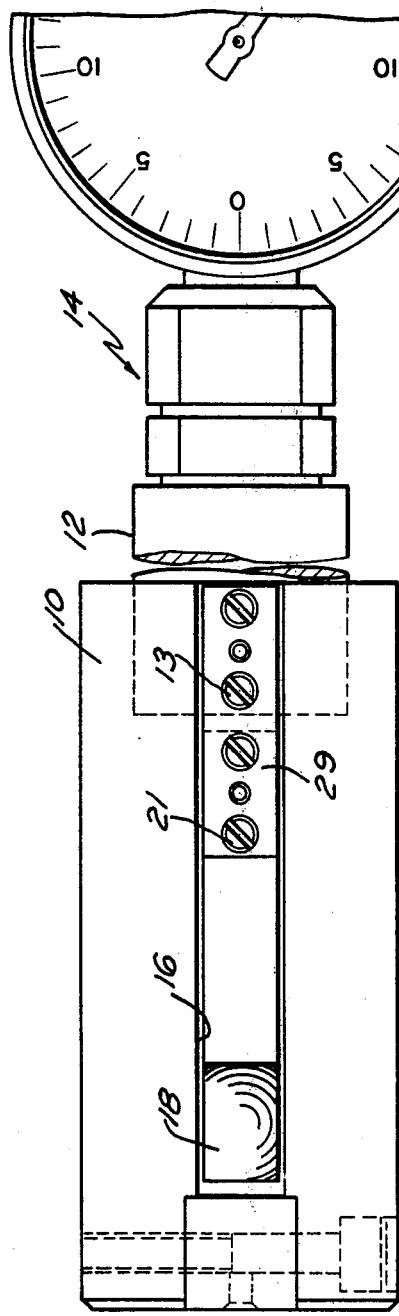
FIG. 1 is a side elevational view partly in section of a bore gage constructed in accordance with the invention.

The bore gage comprises a tubular casing 10 which has an extension 12 and is provided with a coupling unit generally indicated 14 for coupling to an indicating device, such as a dial indicator or the like, or, for that matter, any other type of instrumentation that can measure axial movement of a member. In the casing 10 there is provided a pair of opposed transverse openings 16 and contact elements 18, 18' extend through these openings being mounted on supports 19, 19' which in turn are permitted to deflect being fastened to the casing 10 by flat leaf springs 20, 20' that are secured as by fasteners 21, 13. Recesses 22, 22' are provided in the support bars 19, 19' and within these recesses are located spherical balls 24, 24'.

Figure 4:
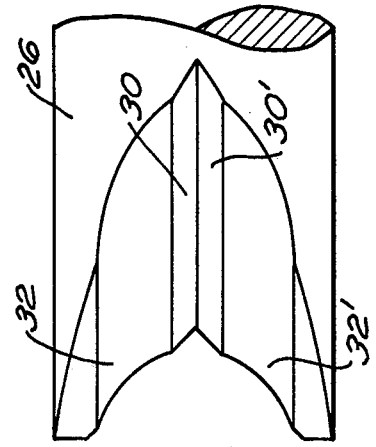
FIG. 4 is a perspective view of the longitudinal measuring element.

In the casing 10 and 12 there is placed a longitudinally movable member in the form of a rod 26 which is suppported within the casing extension 12 by having an enlarged collar 27 that is received within a bore 28 which, in practice, is shown as being a portion of the coupling assembly 14 which for convenience has been threaded into the end of the casing extension 12. V shaped grooves 30 and 30' as seen best in FIG. 4 are provided on the other end of the rod 26 and extending at an angle to the axis of the rod, these V shaped sections are provided with cylindrical segments 32, 32'. The cylindrical segments intersect and can be described mathematically. Let r equal the radius of the cylindrical segment which is equal to the radius of the spherical balls 24, 24'. If the separation distance in the Y plane is equal to $2K_1$ and $K_2$ is equivalent to the slope of the cylinder as seen in the X-Y axis plane, and X, Y, Z are the axes of the standard orthogonal coordinate system, then the following formulas will describe the intersecting cylindrical segments in the V shaped grooves.

$$(Y-K_1-K_2X)^2+Z^2=r^2$$

and $$(Y+K_2-K_2X)^2+Z^2=r^2$$

Figure 2:
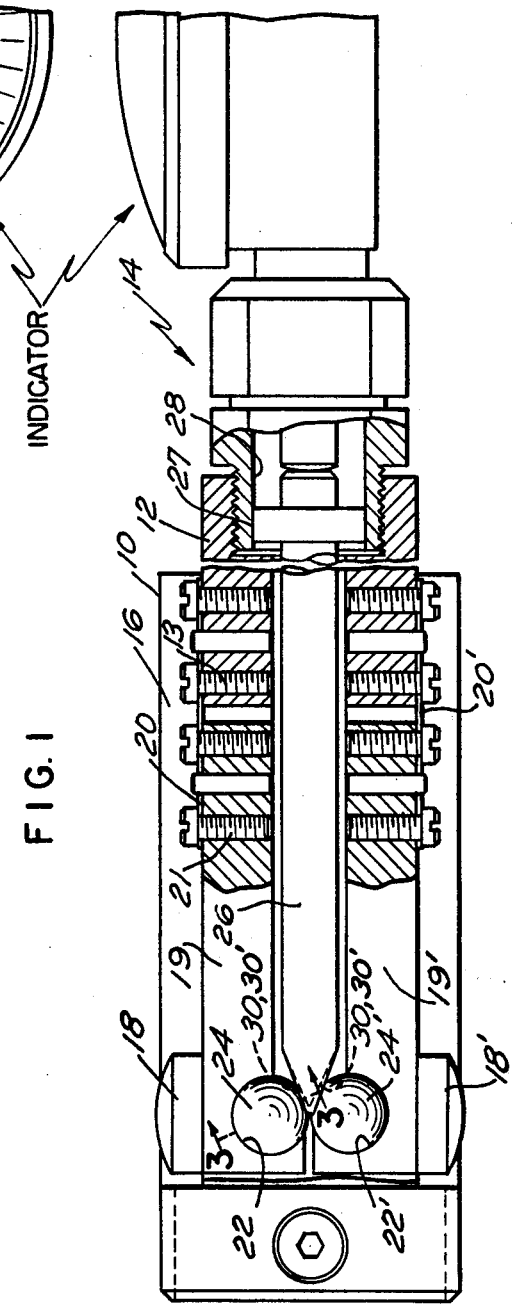
FIG. 2 is a top view thereof.
Figure 3:
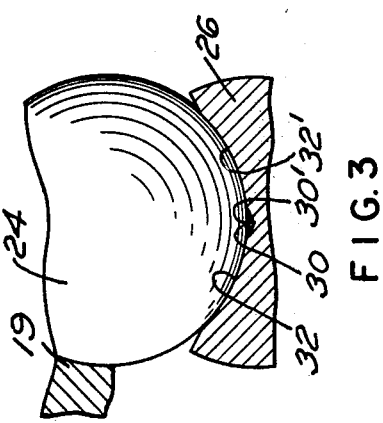
FIG. 3 is a sectional view taken on lines 3—3 of FIG. 2.

In actuality, therefore, we have two cylindrical segments that intersect and the ball or sphere 24 is guided by the surfaces 32. It will be appreciated that in practice the cylindrical segments should be lapped with cylinders of the same diameter as the spheres that are being used and in this way there will be a spherical line contact to distribute all of the pressure load and wear. Further in the construction of FIGS. 1 and 2, the engagement of the spheres 24, 24' will prevent any sideplay by virtue of the flat springs 20, 20' and will essentially give motion to contact points 18, 18' that will find themselves quite readily on the diameter of the bore to be measured.

FIGS. 5, 6 and 7, a second embodiment of the invention is illustrated in which similar parts bear the suffix a. In this embodiment there is provided cylindrical contact members 18a that have upper surfaces as at 40 that are, in effect, spherical polygons and similarly lower surfaces 42 that indeed are also spherical polygons, a spherical polygon being a portion of a spherical surface that is defined as being bounded by three or more arcs of great circles. The contact points are held within the aperture 16a by plates, such as 43, 43', that prevent them from coming outwardly to any great extent by narrowing the opening of the aperture 16a. In all other respects the device is virtually identical to the description that accompanied FIGS. 1 and 2, the longitudinal member or rod 26a having the identical construction and being supported in similar fashion.

Referring now to FIGS. 8 and 9, the third embodiment, corresponding parts are designated with the suffix letter b. In this arrangement the contact elements are formed as complete spherical bails 18b which have a slot 45 cut on their equator and into this slot there extends a support bar 19b, the support bar having welded thereto a leaf spring 20b that is fastened to the tubular casing by fasteners such as 13b. By virtue of the fact that the contact points 18b are supported on a physical member, they will not pass out through the aperture 16b any great distance. In all other respects the operation of the bore gage is identical to that previously described in connection with FIGS. 1 and 2, the contact elements being complete spheres where again the radius of the sphere is equal to the radius of the cylindrical segment in the end of the longitudinal member or rod 26b.

I claim:

1. A bore gage comprising a tubular casing having a diametrically extending transverse opening adjacent one end thereof, movable contact elements slidably received in opposite ends of said opening and having outer surfaces to engage the bore to be measured, a longitudinal member axially slidable in said casing, one end of said longitudinal member provided with a pair of V shaped grooves each having faces with cylindrical segments of a single circle whose axis passes through the axis of the longitudinal member, said contact elements engaging the cylindrical segments with a curved surface having a diameter equal to the diameter of the circle defined by the segments on the faces of the V shaped grooves.

2. A bore gage as in claim 1 wherein the contact elements have spherical polygon portions that engage the cylindrical segments.

3. A bore gage as in claim 2 wherein the spherical polygon portions are provided on a support bar that is arranged for movement by a leaf spring means attached to said tubular casing.

4. A bore gage as in claim 1 wherein the contact elements are spherical members that engage the cylindrical segments.

5. A bore gage as in claim 4 wherein the spherical members are supported by leaf spring means that are attached to said casing.

* * * * *